Nov. 22, 1927.  1,649,852
E. M. PATTERSON
HOLDER FOR FEEDING BOTTLES
Filed Feb. 15, 1927
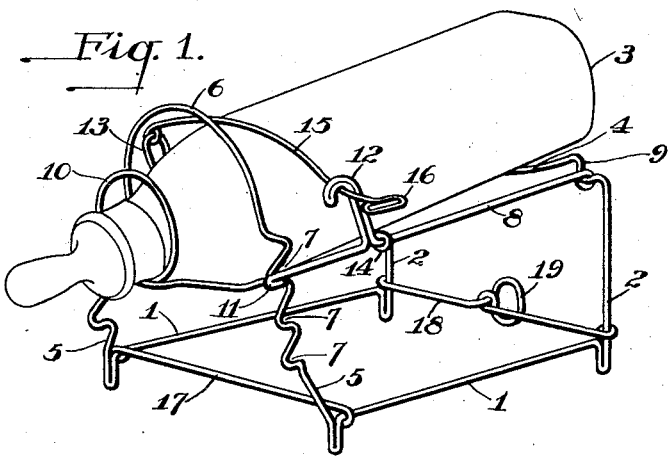
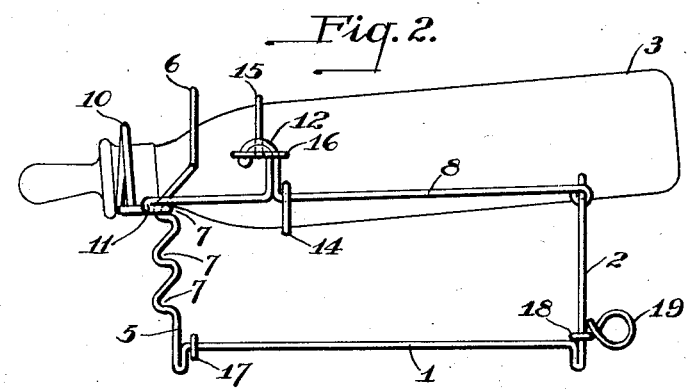
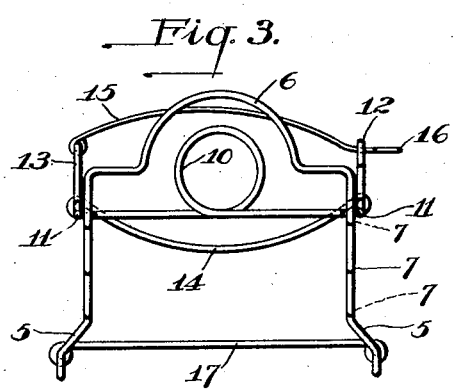
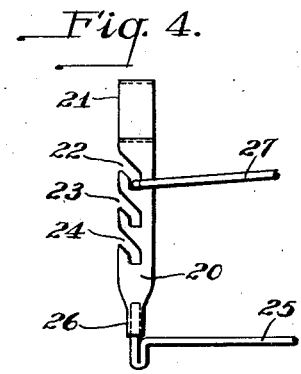
INVENTOR
Edwin M. Patterson
by
James E. Bradley
Atty Patented Nov. 22, 1927.

1,649,852

UNITED STATES PATENT OFFICE.

EDWIN M. PATTERSON, OF CARNEGIE, PENNSYLVANIA.

HOLDER FOR FEEDING BOTTLES.

Application filed February 15, 1927. Serial No. 168,323.

The invention relates to holders for feeding bottles. It has for its objects the provision of a very cheap, simple structure, which will hold any size bottle securely; which permits the ready insertion and removal of the bottle; and which can easily be adjusted so that the end of the bottle lies at any desired elevation, and so that the bottle has any desired angle of adjustment. Certain embodiments of the invention are illustrated in the accompanying drawings, wherein:

Figure 1 is a perspective view of the device. Fig. 2 is a side elevation. Fig. 3 is a front elevation. And Fig. 4 is a partial side elevation showing a modification.

Referring to the drawings, the main framework of the device is made from a single wire of suitable stiffness comprising the two bottom lengths 1, 1, the rear uprights 2, 2, the upper rear transverse member 4 which lies beneath and supports the rear end of the bottle 3, and the front uprights 5, 5, connected at the top by the U-shaped member 6 and having the adjusting notches 7, 7 and 7. All of these parts are made from the single wire bent as shown in the drawings.

A second piece of wire comprises two side lengths 8, 8 connected at their front ends by the loop 10 and hooked at their rear ends to the bends 9 where the lengths 2 and 4 join. The forward ends of the lengths 8, 8 are also bent to form the hook members 11 adapted to catch in the notches 7, 7 and 7, and intermediate their ends are formed into the hook 12 and loop 13.

Extending transversely of the bottle adjacent the hooks 12, 12 is the member 14. The bottle is clamped tightly against the member 14 by the upper transverse locking member 15 hooked at one end to the loop 13, and at its other end passing beneath the hook 12 and provided with the handle 16.

Stiffening members 17 and 18 extend transversely from one side of the frame to the other, with their ends clamped tightly around the ends of the members 1, 1 and 2, 2, as shown. The member 18 is provided intermediate its ends with a loop 19. A safety pin, hooked through this loop and pinned to the pillow or sheet, serves to anchor the frame firmly in position and prevents its being easily upset.

The bottle is shown with its forward end at its highest position of adjustment. It may be lowered, by having the hook members 11, 11 at the forward ends of the members 8, 8 engage the lower notches 7, 7. A half notch adjustment may also be made by moving only one of the hook members 11 up or down. The construction can be cheaply made, and is at the same time sufficiently stiff and strong to maintain its shape after a long period of service. The hook members 11, 11 are engaged with the notches firmly, due to the stiffness of the frame, so that accidental displacement is avoided, and at the same time there is no difficulty in making an adjustment. This is also true of the holding bar 15 which hooks under considerable tension, thus holding the bottle securely, but at the same time permitting its ready removal. The flexibility of the members 14 and 15 is such as to permit the secure gripping of bottles of different diameters. The U-shaped member 6 in connection with the loop 10 serves as convenient means for gripping between the thumb and fingers for releasing the hook members 11, 11 from the notches 7 preliminary to making an adjustment, the two first fingers being hooked behind the member 10, while the thumb is pressed against the top of the loop 10.

Fig. 4 illustrates a modification designed to cheapen the construction somewhat. Here the uprights 20, 20 of stamped sheet metal take the place of the uprights 5, 5 of the Fig. 1 construction. These members are connected at their tops by a curved portion 21, corresponding to the part 6 of the first construction. The notches 22, 23 and 24 take the place of the notches 7, 7, 7 and are engaged by hook members at the forward ends of the members 27, 27, corresponding to the members 8, 8. The bottom members 25, 25 corresponding to the members 1, 1 of Fig. 1, are secured to the lower ends of the members 20, 20, as indicated at 26, by crimping the sheet metal tightly around the ends of the wire, preferably with the application of a little solder. The rest of the construction is the same as that of Figs. 1 to 3.

The construction may be modified in various ways, without impairment of its utility, and without departing from the invention as defined in the claims. The one piece wires may be made in several parts, if desired, suitably secured together, and the notches may be made with various other configurations, which also applies to the hook engagement between the parts 12 and 15. The loop 10 may also be modified in various ways, the principal requirement here being a support for the bottle neck. While preferably made to completely encircle the neck of the bottle and project above it, as shown, this is not necessary, as a partial loop or bend will perform the function, the invention contemplating any connection between the forward ends of the members 8, 8 arranged to support the bottle neck.

What I claim is:

1. A bottle holder comprising a rectangular metal frame having at its rear end a pair of uprights with a transverse member at the upper ends thereof for supporting the rear end of a bottle, said frame also having at its forward end a pair of uprights, each provided with a series of notches, and extending up over the front end of the bottle and meeting to form an inverted U, an adjusting frame of metal comprising a pair of side members hinged at their rear ends to the upper ends of the first mentioned pair of uprights and having their forward ends formed into a bend for engaging the front end of the bottle, and provided intermediate their ends with portions adapted to engage said notches, and means also carried by said side members intermediate their ends for releasably clamping the body of the bottle.

2. A bottle holder comprising a rectangular metal frame having at its rear end a pair of uprights with a transverse member at the upper ends thereof for supporting the rear end of a bottle, said frame also having at its forward end a pair of uprights, each provided with a series of notches, and extending up over the front end of the bottle and meeting to form an inverted U, an adjusting frame of metal comprising a pair of side members hinged at their rear ends to the upper ends of the first mentioned pair of uprights and having their forward ends bent into a holder for the front end of the bottle, and provided intermediate their ends with portions adapted to engage said notches, a member extending transversely of the side members intermediate their ends for supporting the body of the bottle, and a clamping bar in opposition to the transverse member having one end hinged to one of the side members and having a releasable interlocking engagement at its other end with the other of the side members.

3. A bottle holder comprising a rectangular metal frame having at its rear end a pair of uprights with a transverse member at the upper ends thereof for supporting the rear end of a bottle, said frame also having at its forward end a pair of uprights, each provided with a series of notches, and extending up over the front end of the bottle and meeting to form an inverted U, an adjusting frame of metal comprising a pair of side members hinged at their rear ends to the upper ends of the first mentioned pair of uprights and having their forward ends formed into a loop for encircling the front end of the bottle, and provided intermediate their ends with portions adapted to engage said notches, a transverse bar beneath the bottle secured at its ends to said side members, a clamping bar adapted to lie over the bottle in opposition to said transverse bar, and securing means for said clamping bar formed integral with said side members and projecting upwardly therefrom.

4. A bottle holder comprising a rectangular metal frame having at its rear end a pair of uprights with a transverse member at the upper ends thereof for supporting the rear end of a bottle, said frame also having at its forward end a pair of uprights, each provided with a series of notches, and extending up over the front end of the bottle and meeting to form an inverted U, an adjusting frame of metal comprising a pair of side members hinged at their rear ends to the upper ends of the first mentioned pair of uprights and having their forward ends formed into a loop for encircling the front end of the bottle, and provided intermediate their ends with portions adapted to engage said notches, a transverse bar beneath the bottle secured at its ends to said side members, a clamping bar adapted to lie over the bottle in opposition to said transverse bar, and securing means for said clamping bar formed integral with said side members and projecting upwardly therefrom, one of said securing means comprising a loop to which the clamping bar is hinged, and the other of said securing means comprising a hook for releasably engaging the end of the clamping bar.

In testimony whereof, I have hereunto subscribed my name this 12th day of Feb., 1927.

EDWIN M. PATTERSON.